(12) United States Patent
Toyama et al.

(10) Patent No.: US 8,357,467 B2
(45) Date of Patent: Jan. 22, 2013

(54) LITHIUM SECONDARY BATTERY

(75) Inventors: Tatsuya Toyama, Tokai (JP); Kazushige Kohno, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 413 days.

(21) Appl. No.: 12/372,751

(22) Filed: Feb. 18, 2009

(65) Prior Publication Data

US 2009/0220862 A1 Sep. 3, 2009

(30) Foreign Application Priority Data

Feb. 29, 2008 (JP) ................. 2008-049866

(51) Int. Cl.
*H01M 4/48* (2010.01)

(52) U.S. Cl. ......... 429/220; 429/221; 429/223; 429/224

(58) Field of Classification Search .................. 429/220, 429/221, 223, 224
See application file for complete search history.

(56) References Cited

U.S. PATENT DOCUMENTS 6,287,727 B1 * 9/2001 Horie et al. .................. 429/224
6,890,456 B2 * 5/2005 Noda et al. ................. 252/518.1

FOREIGN PATENT DOCUMENTS

| JP | 2000-30709 | 1/2000 |
|----|------------|--------|
| JP | 2003-178759 | 6/2003 |

* cited by examiner

*Primary Examiner* — Stuart Hendrickson
(74) *Attorney, Agent, or Firm* — Antonelli, Terry, Stout & Kraus, LLP.

(57) ABSTRACT

To provide a lithium secondary battery excellent in the life characteristic and the power density. A lithium secondary battery, comprising: a positive electrode capable of intercalating and deintercalating lithium; and an negative electrode capable of intercalating and deintercalating lithium, wherein the positive electrode contains a manganese-containing positive electrode active material of a spinel structure and an oxide that coats the surface of this positive electrode active material, wherein the oxide contains a metallic element, wherein the metallic element forms a solid solution with the positive electrode active material, and wherein the atomic concentration of the metallic element is approximately 0 at depths of from 50 to 100 nm from an external surface of the negative electrode.

13 Claims, 3 Drawing Sheets

US 8,357,467 B2

LITHIUM SECONDARY BATTERY

FIELD OF THE INVENTION

The present invention relates to lithium secondary batteries using a manganese-based spinel compound as a positive electrode active material.

BACKGROUND OF THE INVENTION

In recent years, the lithium secondary battery is widely used as the power supply of a personal computer, a portable device, and the like because it has a high power density. Furthermore, the lithium secondary battery has been studied for applications to the power supplies for environmentally-friendly electric vehicles and hybrid vehicles, and also applications to stationary power supplies and the like for absorbing the output fluctuation due to natural phenomena in combination with renewable energy power generation, such as photovoltaic power generation, or wind power generation. In the field of such large-sized lithium batteries, inexpensiveness and long-life as well as high-performance are required.

The examples of the positive electrode active material of the lithium secondary battery include $LiCoO_2$, $LiFePO_4$, and $LiMn_2O_4$. Although $LiCoO_2$ is most promising in terms of the battery performance, cobalt as the raw material is expensive and thus it is difficult to reduce cost. Moreover, if the lithium secondary battery is held in high voltage state, Co will dissolve from the positive electrode active material and the battery life will decrease significantly. For $LiFePO_4$, the raw material cost is inexpensive because iron is used but its manufacturing cost is high. Furthermore, in terms of the battery performance, $LiFePO_4$ has a problem that the power density is low because the electron conductivity is low or the true density is low. On the other hand, $LiMn_2O_4$ is advantageous in terms of cost because the deposit of manganese as the raw material is 60 or more times as compared with that of cobalt, and furthermore the electron conductivity and the true density are approximately equal to those of $LiCoO_2$.

However, $LiMn_2O_4$ has a problem that when the temperature thereof is increased, Mn will dissolve from the positive electrode active material, resulting in a decrease in the battery life. For such problems, for example, Patent Document 1 proposes that a part of manganese in the surface of the active material particle is substituted with a transition metal to form a surface layer, thereby suppressing the dissolution of manganese and achieving a long battery life. Although the thickness of the substitution layer in this method is not clear, judging from the description of claim 6 and the like the thickness of this substitution layer is estimated as on the order of 1 to 2 μm.

Moreover, Patent Document 2 proposes that a volume change of the positive electrode active material associated with charge and discharge is suppressed with a surface layer having a high fracture toughness value, thereby improving the cycle life.

[Patent Document 1] JP-A-2000-030709
[Patent Document 2] J-A-2003-178759

BRIEF SUMMARY OF THE INVENTION

An object of the present invention is to provide a lithium secondary battery having excellent cycle-life characteristic as well as a high initial capacity by specifying the coating state of an oxide, the oxide being obtained by treating the surface of a spinel-type positive electrode active material, and thereby suppressing the dissolution of Mn from the positive electrode active material.

The present invention relates to a lithium battery comprising: a positive electrode capable of intercalating and deintercalating lithium; and an negative electrode capable of intercalating and deintercalating lithium, wherein the positive electrode contains a manganese-containing positive electrode active material of a spinel structure and an oxide that coats the surface of this positive electrode active material, wherein the oxide contains one or more kinds of metallic elements, wherein the metallic element forms a solid solution with the positive electrode, and wherein the atomic concentration of the metallic element is approximately 0 at an average depth of from 50 to 100 nm from an external surface of the positive electrode active material.

DESCRIPTION OF REFERENCE NUMERALS

Figure 1:
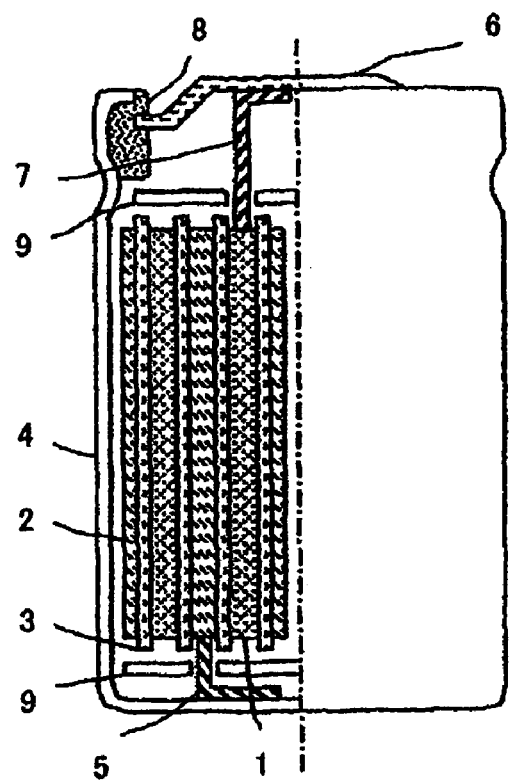
FIG. 1 shows a schematic cross section of a lithium secondary battery.

1 . . . positive plate, 2 . . . negative plate, 3 . . . separator, 4 . . . battery can, 5 . . . negative lead, 6 . . . lid portion, 7 . . . positive lead, 8 . . . packing, 9 . . . insulating plate, 10 . . . lithium secondary battery, 11 . . . cell controller, 12 . . . battery controller, 13 . . . signal line, 111 . . . input section, 112 . . . output section

DETAILED DESCRIPTION OF THE INVENTION

In the present invention, the positive electrode active material comprises a manganese-containing positive electrode active material of a spinel structure, and an oxide containing a metallic element that coats the surface of this positive electrode active material. This positive electrode active material is an assembly of particles, and a metallic element containing oxide layer formed in this surface coats the particle surface of this positive electrode active material. Then, the metallic element within the oxide forms the solid solution with the positive tive electrode active material. The average depth of the solid solution layer is preferably in a range of 50 to 100 nm.

For the dissolution of Mn from the positive electrode active material, it is thought that a trivalent Mn existing near the surface of the positive electrode active material transforms into a divalent Mn and a tetravalent Mn by disproportionation reaction and then the divalent Mn will dissolve. In order to suppress the dissolution of Mn from the positive electrode active material without reducing the initial capacity of the battery, the present invention focused on the state of a surface treatment of the positive electrode active material. Generally, the objective of the positive electrode active material whose surface is coated with other compound is to reduce the contact area between an electrolyte and the positive electrode active material, thereby contributing to suppress the disproportionation reaction of Mn due to activating components such as hydrogen fluoride contained in the electrolyte. Some coating compounds contribute to the intercalation and deintercalation of lithium, while others do not. In the case of a compound contributing to the intercalation and deintercalation of lithium, the battery capacity will not decrease by coating, however, when the coefficients of expansion and contraction due to charge-and-discharge reaction differ between the coating compound and the positive electrode active material, a distortion will occur at the interface therebetween and the coating effect cannot be obtained.

On the other hand, in the case of a compound that does not contribute to the intercalation and deintercalation of lithium, the battery capacity will decrease depending on the coating amount, and moreover, when the volume change due to the charge-and-discharge reaction of the positive electrode active material is large, a distortion will occur. Then, in order not to be adversely affected by this distortion while minimizing the capacity decrease, it is important to use a minimum amount of coating metallic element that causes an effect on the dissolution of Mn and to dissolve this metallic element with the positive electrode active material. In the present invention, a solid solution comprising a positive electrode active material and a metallic element oxide used in treating the surface of the positive electrode active material is formed so that the atomic concentration of this metallic element may become approximately 0 at the average depth of from 50 to 100 nm from the external surface of the positive electrode. In other words, this is substantially synonymous with that the average thickness of the solid solution layer is in a range of 50 to 100 nm.

The "solid solution" used in the present invention is formed from a positive electrode active material and a metallic element oxide used in treating the surface of the positive electrode active material. Moreover, one or more kinds of metallic elements contained in the oxide in the present invention are elements that are not contained in the positive electrode active material, and do not include an element within the positive electrode active material that may move by the heat treatment in the coating process or by the charge-and-discharge reaction.

Discrimination between a metallic element contained in the positive electrode active material and a metallic element contained in the oxide used in the surface treatment becomes apparent from the concentration gradient in the depth direction from the positive electrode active material surface. A metallic element whose concentration gradient increases from the surface toward the depth direction is the metallic element contained in the positive electrode active material, while a metallic element whose concentration gradient decreases from the surface toward the depth direction is the metallic element contained in the oxide used in coating.

Most preferably, the present invention provides a lithium secondary battery having excellent cycle-life characteristic as well as a high initial capacity by specifying the coating state of an oxide, the oxide being obtained by treating the surface of a spinel-type positive electrode active material, and thereby suppressing the dissolution of Mn from the positive electrode active material.

Embodiments for implementing the present invention will be shown hereinafter. FIG. 1 shows a schematic cross section of the lithium secondary battery. In the lithium secondary battery, a separator 3 is interposed between a positive plate 1 and a negative plate 2. These positive plate 1, negative plate 2, and separator 3 are rolled up and then enclosed together with a nonaqueous electrolyte into a battery can 4 made of stainless steel or aluminum. A positive lead piece 7 is formed in the positive plate 1 and a negative lead piece 5 is formed in the negative plate 2, respectively, and current is taken out therethrough. Between the positive plate 1 and the negative lead piece 5 and between the negative plate 2 and the positive lead piece 7, an insulating plate 9 is formed, respectively. Moreover, between the battery can 4 in contact with the negative lead piece 5 and a sealing lid portion 6 in contact with the positive lead piece 7, a packing 8 for preventing leakage of the electrolyte and separating a positive pole from a negative pole is formed.

The positive plate 1 is formed applying a positive electrode mixture to a collector comprising aluminum and the like. The positive electrode mixture contains an active material contributing to the intercalation and deintercalation of lithium, a conductive material, a binder, and the like.

The negative plate 2 is formed applying a negative electrode mixture to a collector comprising copper and the like. The negative electrode mixture contains an active material contributing to the intercalation and deintercalation of lithium, a conductive material, a binder, and the like. As the negative electrode active material, metal lithium, a carbon material, or a material capable of inserting lithium or forming a compound thereof can be used, while the carbon material is suitable in particular.

Examples of the carbon material include graphites, such as natural graphite and artificial graphite, and amorphous carbons, such as carbides of coal-based coke and coal-based pitch, carbides of petroleum-based coke and petroleum-based pitch, and carbides of pitch coke. Preferably, the above-described carbon materials subjected to various kinds of surface treatments are desirable. These carbon materials can be used alone as well as in combination of two or more kinds thereof.

Moreover, examples of the materials capable of inserting lithium or forming a compound thereof include the metals, such as aluminum, tin, silicon, indium, gallium, and magnesium, an alloy containing these elements, and a metal oxide containing tin, silicon, or the like. Furthermore, the examples of the materials also include a composite material of the above-described metal, alloy, or metal oxide, and carbon material such as graphite or amorphous carbon.

As the active material of the positive plate 1, a lithium manganese complex oxide having a crystal structure of a spinel structure (hereinafter, referred to as "spinel manganese") is used. Then, in the active material of the positive plate 1, primary particles gather to form a secondary particle, and the average particle size of the secondary particle is in a range of 10 to 40 μm, and the one having the average particle size in a range of 10 to 30 μm is particularly preferable.

As such spinel manganese, specifically, the one represented by a general formula $Li_aMn_bM_cO_4$ (where, $1.0 \leq a \leq 1.15$, $1.8 \leq b \leq 1.94$, $0.01 \leq C \leq 0.10$, and $a+b+c=3$, M is one or more elements selected from a group consisting of Mg, Ni, and Cu) is used.

Here, the content "a" of Li is $1.0 \leq a \leq 1.15$, however, if $a<1.0$, then other element will enter the Li site, preventing diffusion of lithium ions and degrading the cycle characteristic. Moreover, if $1.15<a$, then the average valence of Mn will increase significantly so as to maintain electrical neutrality. In the spinel manganese, electrons are deintercalationed by a trivalent Mn being transformed into the quadrivalent during charging, and therefore, the lower the ratio of the trivalent Mn, the further decrease in the battery capacity is caused. It is therefore not preferable that the average valence of Mn exceed 3.75. Then, by setting the content "a" of Li in the spinel manganese to $1.0 \leq a \leq 1.15$, a longer battery life and an increase in the power density can be achieved.

As the metallic element contained in the oxide, a trivalent metallic element is preferable. In order to reduce the trivalent Mn, which causes the dissolution of Mn, near the surface of the spinel manganese, it is necessary to dissolve the trivalent or lower valent metallic elements and increase the content of the tetravalent Mn. Furthermore, in order to substitute over a large area near the surface, it is effective to distribute the substitutional elements over a large area. From such viewpoint, it is preferable to dissolve the trivalent element rather than the divalent or lower valence elements that can even in small quantities increase the ratio of the tetravalent Mn.

As the trivalent metallic element to dissolve, Al, Co, and Fe are preferable. Here, it turned out that when the solid solution state of a metallic element is specified using the atomic concentration distribution of the metallic element, the atomic concentration of the metallic element needs to decrease from the external surface toward the inside and become approximately 0 at depths of from 50 to 100 nm from the external surface.

According to the present invention, there is provided a lithium secondary battery comprising: a positive electrode capable of intercalating and deintercalating lithium; and a negative electrode capable of intercalating and deintercalating lithium, wherein the positive electrode contains a manganese-containing positive electrode active material of a spinel structure and an oxide containing a metallic element that coats the surface of this positive electrode active material, wherein the metallic element forms a solid solution with the positive electrode active material, wherein the average thickness of this solid solution layer is in a range of 50 to 100 nm from the external surface of the positive electrode active material, wherein the capacity retention after 1000 cycles performed in a range of 2.7 to 4.2 V at 0.2 C under environment of 50° C. is no less than 85%, and wherein the power density is no less than 90 Wh/kg. When the average thickness of the solid solution layer is in a range of 50 to 100 nm, it is possible to provide a lithium battery, whose capacity retention is no less than 85% and whose power density is no less than 90 Wh/kg, having a long-life characteristic and a high capacity. According to the present invention, it is possible to provide a lithium secondary battery wherein the dissolution amount of MN from the positive electrode active material measured with a predetermined method described later is no more than 2 Wt ppm.

When the atomic concentration of a metallic element becomes 0 at a depth less than 50 nm from the external surface, the solution is insufficient and thus the capacity retention cannot be improved. Moreover, when the atomic concentration of a metallic element exceeds 0 at a depth of 100 nm from the external surface, the atomic concentration of the metallic element near the external surface will decrease and the metallic element cannot serve to reduce the contact area between the positive electrode active material and the electrolyte, resulting in a decrease in the capacity retention. The existence form of the metal element is thought to be a metal oxide in the external surface of the positive electrode active material and be in solid solution with the spinel manganese thereinside. In order for the atomic concentration of a metallic element to become 0 at depths of 50 to 100 nm from the external surface, the thickness of the metal oxide is from 1 to 20 nm, more preferably from 3 to 10 nm.

Moreover, if the atomic concentration of a metallic element in the external surface is less than 10%, no effect of the solution can be seen, and if it exceeds 40%, the electron conductivity will decrease and the battery characteristic will degrade significantly. Accordingly, this atomic concentration is preferably in a range of 10 to 40%.

It turned out that in order for a metallic element to be in solid solution with the spinel manganese, and for the atomic concentration of the metallic element to become approximately 0 at the average depth of from 50 to 100 mm from the external surface and furthermore to become 10 to 40% in the external surface, the metallic element contained in the metal oxide may be 0.05 to 0.5 wt % relative to Mn contained in the spinel manganese.

On the other hand, in order to suppress the dissolution of Mn just by dissolving the trivalent metallic element, a plenty of trivalent metallic elements need to be dissolved, which would then reduce the initial capacity of the battery. Therefore, for the spinel manganese, the average valence of the Mn within the spinel manganese needs to be increased in advance by element substitution.

In order to substitute an element for the spinel manganese, the kind and content of the substitutional element is important. That is, if the substitutional element is trivalent, then the required substitutional amount will increase and the crystal structure is likely to collapse due to a difference in the ion radius. Therefore, a divalent element which even in small quantities can increase the average valence of the Mn is preferably selected as the substitutional element.

As the divalent metallic element to substitute, Mg, Ni, and/or Cu are preferable. The substitutional amount "c" of the metal substitutional element is $0.01 \leq c \leq 0.10$, however, if $c<0.01$, the increase of the average valence of Mn due to the substitution is very small and the effect of substitution will not be exhibited. On the other hand, if $0.10<c$, the average valence of Mn will increase significantly, resulting in a decrease of the battery capacity. Note that, taking into consideration the atomic ratio of these Li, substitutional element M, and O, the atomic ratio "b" of Mn is preferably $1.8 \leq b \leq 1.94$.

The lithium secondary battery using the spinel manganese as described above has the capacity retention no less than 85% after 1000 cycles performed in a range of 2.7 to 4.2 V at 0.2 C under environment of 50° C.

Now, a manufacturing method using the spinel manganese as the positive electrode active material is described.

As the raw material of the positive electrode active material, the following ones can be used. As the lithium compound, lithium hydroxide, lithium carbonate, lithium nitrate, lithium acetate, lithium chloride, lithium sulfate, or the like can be used, while lithium hydroxide or lithium carbonate is preferable.

As the manganese compound, manganese hydroxide, manganese carbonate, manganese nitrate, manganese acetate, manganese sulfate, manganese oxide, or the like can be used, while manganese carbonate or manganese oxide is preferable.

Examples of the compounds of the substitutional element M include hydroxide, carbonate, nitrate, acetate, sulfate, and oxide.

The material serving as the raw material is supplied as a powder having a predetermined composition ratio, and this is ground and mixed using a mechanical method, such as a ball mill. In grinding and mixing, either of a dry type method and a wet type method may be used. The maximum particle size of the ground raw powder is preferably no greater than 1 μm, more preferably no greater than 0.5 μm.

Then, the obtained powder is calcinated at temperature of from 800 to 1000° C., preferably from 850 to 950° C. The atmosphere in calcinating is preferable an oxidative gas atmosphere containing oxygen, air, or the like.

Next, a surface treatment is carried out using the positive electrode active material obtained this way. As the method of surface treatment, principally a solid phase synthesis and a liquid phase synthesis are enumerated, while the liquid phase synthesis is preferable in order to prepare a solid solution having an arbitrary depth. The surface treatment method using the liquid phase synthesis is shown below.

A specified quantity of nitrate, acetate, and sulfate containing one or more metallic elements selected from a group consisting of Al, Co, and Fe is dissolved into water or an organic solvent. In this case, a compound containing a non-metallic element, such as phosphorus or boron, may be dissolved.

Then, the resultant aqueous solution is adjusted using a pH adjuster so as to be weak alkaline (PH=8 to 10). Examples of the pH adjuster include ethanolamine, sodium hydroxide, lithium hydroxide, citric acid, and nitric acid. The positive electrode active material is mixed into the thus adjusted solution. For the mixing ratio, the mass ratio between the metallic element used in the surface treatment and the Mn within the spinel manganese is in a range of 0.05 to 0.5 wt %, more preferably 0.2 to 0.4 wt %.

Next, the solvent is evaporated from the obtained solution so as to apply the compound containing the metallic element to the surface of the spinel manganese compound particle. The evaporation of the solvent is preferably carried out by heating and stirring or spray drying.

The thus obtained powder is heat-treated at temperature from 400 to 700° C., preferably 500 to 600° C. It is important to carry out heat treatment in a short time in order to control the diffusion of the coated metallic element, and therefore a microwave heating or plasma heating treatment is preferably carried out. Heat-treatment time is in a range of 5 minutes to 1 hour, preferably 10 minutes to 40 minutes.

(Method of Measuring the Atomic Concentration of an Element Near the Surface of an Active Material)

For the measurement of the atomic concentration of an element near the surface of an active material, an element detected in the sample surface was analyzed in the depth direction using an Auger Electron Spectrometer (Model 650, manufactured by ULVAC-PHI Incorporated) in conjunction with Ar-ion etching. The depth profile was determined based on the depth profile of each element by separating noise using waveform analysis. Then, the resultant depth profile was converted into the atomic concentration using a relative sensitivity coefficient described in the Augier Handbook, thereby calculating the element concentration in the depth direction.

(Method of Measuring the Weight Ratio of Elements)

The weight ratio between the Mn within the spinel manganese and the metallic element used in the surface treatment as well as the weight ratio of the Mn dissolved into the electrolyte were measured using an Inductively Coupled Plasma-Atomic Emission Spectrometer (p-4000, manufactured by Hitachi Ltd.). First, 5 g of positive electrode active material, and 2 ml of nitric acid or 5 ml of electrolyte were put in 45 ml of ion exchange water contained in a beaker, and was stirred by a stirrer for 30 minutes. After standing for 5 minutes, a filtrate filtered through a filter paper was sprayed together with an argon gas into radio frequency atmosphere, and the intensity of light unique to each excited element was measured to calculate the weight ratio of an element.

(Method of Measuring the Average Particle Size of an Active Material)

The average particle size was measured with a laser diffraction/scattering method using a Laser Diffraction, Scattering, Particle Size Distribution Analyzer (LA-920, manufactured by Horiba Ltd.) as follows. First, pure water mixed with 0.2 wt % of hexametaphosphoric acid sodium was used as a dispersing agent, and an active material was put therein. An ultrasonic wave was applied thereto for 5 minutes in order to suppress condensation of the active material, and afterward the median diameter (particle size of a particle whose relative particle weight is 50%) was measured and defined as the average particle size.

An example of a method of manufacturing the lithium secondary battery is shown below. A positive electrode active material is mixed with a conductive material made of a carbon material powder and a binder such as polyvinylidene fluoride to prepare a slurry. The mixing ratio of the conductive material relative to the positive electrode active material is preferably from 3 to 10 wt %. Moreover, the mixing ratio of the binder relative to the positive electrode active material is preferably from 2 to 10 wt %.

In this case, in order to uniformly distribute the positive electrode active material within the slurry, it is preferable to carry out sufficiently kneading using a kneading machine.

The obtained slurry is applied to both sides of an aluminum foil of from 15 to 25 μm thickness using a roll transcription machine or the like, for example. After applying the slurry to both sides, the resultant aluminum foil was pressed and dried to form an electrode plate of the positive plate 1. The thickness of a mixture portion where the positive electrode active material, the conductive material, and the binder are mixed together is preferably in a range of 200 to 250 μm.

For the negative electrode, as in the positive electrode, the negative electrode active material is mixed with a binder, and then applied and pressed and dried to form the electrode. Here, the thickness of the negative electrode mixture is preferably in a ranged of 120 to 170 μm. For the negative plate 2, a copper foil of from 7 to 20 μm thickness is used as the collector. The mixing ratio for coating is preferably about from 90:10 to 98:2, for example, at the weight ratio between the negative electrode active material and the binder.

The obtained electrode plate is cut into a predetermined length to form the electrode, and then a tab portion of a current drawing portion is formed by spot welding or ultrasonic welding. The tab portion comprises a metallic foil of the same quality of the material as that of the rectangular-shaped collector, and is attached in order to draw current from the electrode, and serves as the positive lead 7 and the negative lead 5, respectively.

Between the tabbed positive plate 1 and negative plate 2, a microporous membrane, for example, a microporous separator 3 comprising polyethylene (PE), polypropylene (PP), or the like is sandwiched and laminated, and these are cylindrically rolled up to serve as a group of electrodes, which is then houses into the battery can 4 comprising a cylindrical container. Or, as the separator, a bag-shaped one may be used to house each of the positive and negative electrodes thereinside, and these resultant bag-shaped separators may be sequentially laminated and housed into a square-shaped container. As the quality of the material of the container, stainless steel or aluminum is preferable.

After housing the group of batteries into the battery can 4, a nonaqueous electrolyte is injected therein, and then the battery can 4 is sealed using the lid portion 6 and the packing 8. As the nonaqueous electrolyte, it is preferable to use the one obtained by dissolving a lithium salt, such as lithium hexafluorophosphate ($LiPF_6$), lithium tetrafluoroborate ($LiBF_4$), lithium perchlorate ($LiClO_4$), or lithium bis(oxalato)borate (LiBOB), as the electrolyte, into a solvent, such as ethylene carbonate (EC), propylene carbonate (PC), dimethyl carbonate (DMC), diethyl carbonate (DEC), methyl-ethyl carbonate (MEC), methyl acetate (MA), methylpropyl carbonate (MPC), or vinylene carbonate (VC). The concentration of the electrolyte is preferably from 0.7 to 1.5 M.

A lithium secondary battery prepared in this manner comprises a pair of positive electrode and negative electrode facing to each other via a separator and a nonaqueous electrolyte, wherein the positive electrode contains a positive electrode active material of a spinel structure represented by a general formula $Li_aMn_bM_cO_4$ (where, $1.0 \leq a \leq 1.15$, $1.8 \leq b \leq 1.94$, $0.01 \leq c \leq 0.10$, and $a+b+c=3$, M is one or more elements selected from a group consisting of Mg, Ni, and Cu) and an oxide that coats the surface of the positive electrode active material, wherein the oxide contains one kind of metallic element, wherein the metallic element forms a solid solution with the positive electrode, and wherein the atomic concentration of the metallic element becomes 0 at the average depth of from 50 to 100 nm from the external surface of the positive electrode. By using such positive electrode, a lithium secondary battery having a long-life characteristic and a high power density can be provided.

Hereinafter, the present invention will be described in detail using examples, but the present invention is not limited to these examples.

Example 1

Preparation of the positive electrode active material is described. In Example 1, as the raw material for preparing the positive electrode active material, lithium hydroxide, manganese oxide, and nickel oxide were used and weighed so that Li:Mn:Ni may become 1.07:1.90:0.03 as the raw material ratio, and then the resultant material was wet-ground and mixed with a grinder. The obtained powder was dried and then placed in a high-purity alumina container and temporarily calcinated at 600° C. for 12 hours in order to improve the degree of sintering, and was then cracked after air cooling. Next, in order to form the spinel structure, the cracked powder was again placed in the high-purity alumina container and finally-calcinated at 900° C. for 12 hours, and was then cracked after air cooling.

The composition of the positive electrode active material obtained in this case was $Li_{1.07}Mn_{1.90}Ni_{0.03}O_4$. The valence of each atom is Li:1, Ni:2, and O:−2, and it turned out that the valence of Mn is 3.62 from the charge neutrality condition.

The surface treatment step is described. 2.2 g of aluminum nitrate was dissolved in 400 ml of ion exchange water, and furthermore 0.8 g of lithium hydroxide was dissolved therein to set the pH of the aqueous solution to 9.0. At this instance the aqueous solution became clouded, which confirms the presence of the microparticle of aluminum hydroxide. 100 g of positive electrode active material was put into this aqueous solution and stirred at room temperature for 1 hour, thereby causing aluminum hydroxide to adhere to the surface of the positive electrode active material. Next, this solution was dried with a spray dryer. The obtained powder was placed in a high-purity alumina container, and heated at 600° C. for 20 minutes using a microwave heating device in order to transform the aluminum hydroxide into aluminum oxide and also dissolve Al with the spinel manganese. In this case, Al was 0.26 wt % relative to Mn.

Evaluation on the concentration gradient of a metallic element is described. The atomic concentrations of Al, O, and Mn were measured using Auger Electron Spectroscopy with an electron gun of a heat-radiation type under the conditions of accelerating voltage 5.0 kV and beam current of 90 nA. The depth direction analysis was conducted under the conditions of an ion gun: the accelerating voltage of 3.0 kV, the ionic-species of $Ar^+$, the raster size of 3 mm×3 mm, and the sample gradient of 30 deg.

Figure 2:
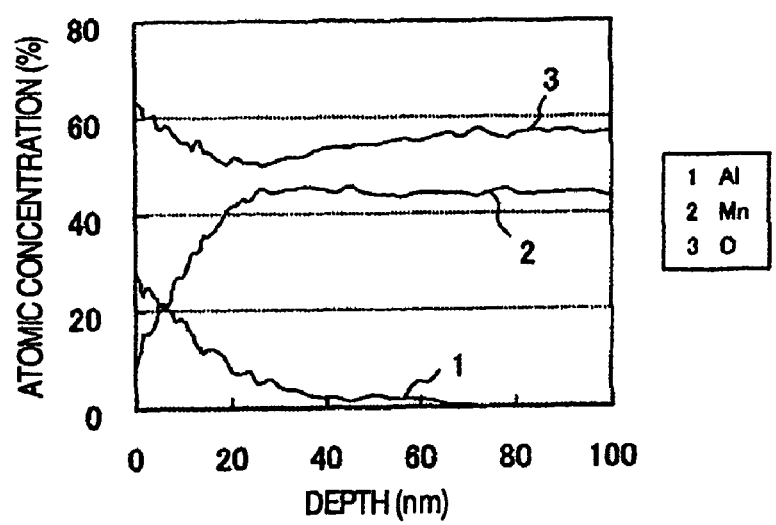
FIG. 2 is a graph showing the atomic concentration versus the sputtering depth at the time of surface treatment of a positive electrode active material to which aluminum oxide is applied.

The obtained atomic concentration versus depth profile is shown in FIG. 2. FIG. 2 shows the concentration (atomic %) of each element with respect to the sputtering depth (nm). In FIG. 2, a curve 1 represents the concentration distribution of Al, a curve 2 represents the concentration distribution of Mn, and a curve 3 represents the concentration distribution of O. This graph reveals that the atomic concentration of Al occupies 30% in the external surface, decreases gradually toward the depth direction and becomes approximately 0% at a depth of 70 nm. On the other hand, the atomic concentration of Mn increases gradually toward the depth direction from the external surface and becomes approximately constant after exceeding the depth of 20 nm. In other words, the layer of $Al_2O_3$ may be dominant from the external surface to 20 nm in depth while from 20 to 70 nm in depth Al may be present in a solid solution with the spinel manganese.

The evaluation on the dissolution amount of Mn is described. Into a fluororesin (PFA) container within a glove box under argon atmosphere, 0.5 g of surface-treated positive electrode active material and 6 cc of electrolyte, the electrolyte being made by dissolving 1 mol/l of $LiPF_6$ into an organic solvent liquid, in which EC and MEC are mixed so that the volume ratio thereof may be 1:2, were placed and sealed. This container was taken out from the glove box and placed in an oven at 80° C. and left for one week. After one week, the container was taken out from the oven, and 5 cc of electrolyte was taken out so that the positive electrode active material might not mix inside the glove box under argon atmosphere. The Mn dissolved into the taken-out electrolyte was quantified using the Inductively Coupled Plasma-Atomic Emission Spectrometer. The calculated dissolution amount of Mn was 1.2 wt ppm.

The characteristics of the positive electrode active material prepared in Example 1 are shown in

TABLE 1

| Positive electrode active material | Composition in $Li_aMn_bM_cO_4$ | | | | Valence of Mn | Surface layer | Amount of surface treatment metal (wt %) | Solution depth (nm) | Dissolution amount of Mn (wtppm) |
|---|---|---|---|---|---|---|---|---|---|
| | a | b | M | c | | | | | |
| Example 1 | 1.07 | 1.90 | Ni | 0.03 | 3.62 | $Al_2O_3$ | 0.26 | 70 | 1.2 |

Preparation of a 18650 (diameter 18 mm×height 650 mm) type battery is described. The 18650 type battery was prepared using the obtained positive electrode active material. First, the surface-treated positive electrode active material, the conductive material made of a carbon material powder, and the binder made of PVdF were mixed so as to be 90:4.5: 5.5 at weight ratio, and then an adequate amount of NMP was added therein to prepare a slurry. The prepared slurry was stirred and kneaded with a planetary mixer for 3 hours.

Next, the kneaded slurry was applied to both sides of an aluminum foil with 20 μm thickness using a roll transcription type coating machine. This foil was pressed with a roll press machine so that the mixture density may become 2.70 g/cm$^3$, thereby obtaining the positive electrode.

Graphite used as the negative electrode active material, carbon black used as the conductive material, and PVdF used as the binder were mixed so as to be 92.2:1.6:6.2 at weight ratio, and this was stirred and kneaded with a slurry mixer for 30 minutes. The kneaded slurry was applied to both sides of a copper foil with 10 μm thickness using the coating machine, and was pressed with a roll press method after drying, thereby obtaining the negative electrode.

The electrodes of the positive electrode and negative electrode were cut into a predetermined size, respectively, and a current-collector tab was attached to an uncoated portion of the slurry in the electrode by ultrasonic welding.

A microporous polyethylene film was sandwiched between the electrodes of the positive electrode and negative electrode, and these were cylindrically rolled up and then inserted in an 18650 type battery can. After connecting the current-collector tab to the lid portion of the battery can, the lid portion of the battery can and the battery can were welded by laser welding, thereby sealing the battery.

Finally a nonaqueous electrolyte was injected from a liquid discharge plug provided in the battery can, thereby obtaining the 18650 type battery. The battery weight was 39 g.

Evaluation on the power density is described. The power density of the prepared 18650 type battery was evaluated using the following procedure. First, the battery was charged to 4.2 V at a charging rate 0.2 C using the constant current/constant voltage method. After one hour rest was interposed, the battery was constant-current discharged to 2.5 V using the current of the same current value.

The battery capacity at this point was measured, and the power density was calculated from a product of this value and the average voltage 3.7 V. The result is shown in Table 2.

Evaluation on the cycle characteristic is described. The cycle characteristic of the prepared 18650 type battery was evaluated using the following procedure. The battery was constant-current charged to an end-of-charge voltage 4.2 V by feeding a current of 0.3 mA/cm$^2$, and after one hour rest was interposed, the battery was constant-current discharged to 2.7 V using the same current value. This was repeated 1000 cycles, and the capacity retention of 1000th cycle/first cycle was calculated. Test environment temperature was set to 50° C. The result is shown in Table 2.

TABLE 2

| Positive electrode active material | Power density (Wh/kg) | Capacity retention (%) |
|---|---|---|
| Example 1 | 105 | 88 |

Example 2

In Example 2, except that 1.1 g of cobalt nitrate instead of 2.2 g of aluminum nitrate was used in the surface treatment step, a surface-treated positive electrode active material was prepared as in Example 1. In this case, in the surface of the positive electrode active material, $Co_2O_3$ is dominant.

Co within the obtained positive electrode active material was 0.36 wt % relative to Mn, and the depth at which the atomic concentration of Co becomes approximately 0 was 70 nm. Moreover, the dissolution amount of Mn was 0.9 wt ppm.

The characteristics of the positive electrode active material prepared in Example 2 are shown in Table 3. As in Example 1, a 18650 type batter was prepared, and the weight energy density and the cycle characteristic were evaluated, and the results are show in Table 4. It can be seen that the positive electrode prepared in Example 2 also shows high performance.

Example 3

In Example 3, except that 1.1 g of iron nitrate instead of 2.2 g of aluminum nitrate was used in the surface treatment step, a surface-treated positive electrode active material was prepared as in Example 1. In this case, in the surface of the positive electrode active material, $Fe_2O_3$ is dominant.

Fe within the obtained positive electrode active material was 0.35 wt % relative to Mn, and the depth at which the atomic concentration of Fe becomes approximately 0 was 85 nm. Moreover, the dissolution amount of Mn was 1.6 wt ppm.

The characteristics of the positive electrode active material prepared in Example 3 are shown in Table 3. As in Example 1, a 18650 type batter was prepared, and the weight energy density and the cycle characteristic were evaluated, and the results are show in Table 4. It can be seen that the positive electrode prepared in Example 3 also shows high performance.

Example 4

In Example 4, except that 1.8 g of aluminum nitrate, 0.7 g of diammonium hydrogenphosphate, and 2 g of diethanolamine were used instead of 2.2 g of aluminum nitrate and 0.8 g of lithium hydroxide and heated for 30 minutes using a microwave heating device in the surface treatment step, a surface-treated positive electrode active material was prepared as in Example 1. In this case, in the surface of the positive electrode active material, $AlPO_4$ is dominant.

Al within the obtained positive electrode active material was 0.22 wt % relative to Mn, and the depth at which the atomic concentration of Al becomes approximately 0 was 65 nm. Moreover, the dissolution amount of Mn was 0.6 wt ppm.

The characteristics of the positive electrode active material prepared in Example 4 are shown in Table 3. As in Example 1, a 18650 type batter was prepared, and the weight energy density and the cycle characteristic were evaluated, and the results are show in Table 4. It can be seen that the positive electrode prepared in Example 4 also shows high performance.

Example 5

In Example 5, except that 1.1 g of cobalt nitrate, 0.4 g of diammonium hydrogenphosphate, and 2 g of diethanolamine were used instead of 2.2 g of aluminum nitrate and 0.8 g of lithium hydroxide and heated for 30 minutes using a microwave heating device in the surface treatment step, a surface-treated positive electrode active material was prepared as in Example 1. In this case, in the surface of the positive electrode active material, $Co_3(PO_4)_2$ was dominant.

Co within the obtained positive electrode active material was 0.24 wt % relative to Mn, and the depth at which the atomic concentration of Co becomes approximately 0 was 50 nm. Moreover, the dissolution amount of Mn was 1.0 wt ppm.

The characteristics of the positive electrode active material prepared in Example 5 are shown in Table 3. As in Example 1, a 18650 type batter was prepared, and the weight energy density and the cycle characteristic were evaluated, and the results are show in Table 4. It can be seen that the positive electrode prepared in Example 5 also shows high performance.

Example 6

In Example 6, except that 3.3 g of iron nitrate, 1.2 g of diammonium hydrogenphosphate, and 2 g of diethanolamine were used instead of 2.2 g of aluminum nitrate and 0.8 g of lithium hydroxide in the surface treatment step, a surface-treated positive electrode active material was prepared as in Example 1. In this case, in the surface of the positive electrode active material, $FePO_4$ is dominant.

Fe within the obtained positive electrode active material was 0.24 wt % relative to Mn, and the depth at which the atomic concentration of Fe becomes approximately 0 was 65 nm. Moreover, the dissolution amount of Mn was 1.3 wt ppm.

The characteristics of the positive electrode active material prepared in Example 6 are shown in Table 3. As in Example 1, a 18650 type battery was prepared, and the weight energy density and the cycle characteristic were evaluated, and the results are show in Table 4. It can be seen that the positive electrode prepared in Example 6 also shows high performance.

Example 7

In Example 7, except that magnesium oxide instead of nickel oxide was used as the raw material of the positive electrode active material, a surface-treated positive electrode active material was prepared as in Example 1. In this case, in the surface of the positive electrode active material, $Al_2O_3$ was dominant.

Al within the obtained positive electrode active material was 0.26 wt % relative to Mn, and the depth at which the atomic concentration of Al becomes approximately 0 was 95 nm. Moreover, the dissolution amount of Mn was 1.4 wt ppm.

The characteristics of the positive electrode active material prepared in Example 7 are shown in Table 3. As in Example 1, a 18650 type batter was prepared, and the weight energy density and the cycle characteristic were evaluated, and the results are show in Table 4. It can be seen that the positive electrode prepared in Example 7 also shows high performance.

Example 8

In Example 8, except that copper oxide instead of nickel oxide was used as the raw material of the positive electrode active material, a surface-treated positive electrode active material was prepared as in Example 1.

Al within the obtained positive electrode active material was 0.26 wt % relative to Mn, and the depth at which the atomic concentration of Al becomes approximately 0 was 100 nm. Moreover, the dissolution amount of Mn was 1.0 wt ppm.

The characteristics of the positive electrode active material prepared in Example 8 are shown in Table 3. As in Example 1, a 18650 type batter was prepared, and the weight energy density and the cycle characteristic were evaluated, and the results are show in Table 4. It can be seen that the positive electrode prepared in Example 8 also shows high performance.

Example 9

In Example 9, except that lithium hydroxide, manganese oxide, and nickel oxide were used and weighed so that Li:Mn:Ni may become 1.15:1.80:0.05 at the raw material ratio instead of that Li:Mn:Ni may become 1.07:1.90:0.03, a surface-treated positive electrode active material was prepared as in Example 1.

Al within the obtained positive electrode active material was 0.26 wt % relative to Mn, and the depth at which the atomic concentration of Al becomes approximately 0 was 60 nm. Moreover, the dissolution amount of Mn was 0.5 wt ppm.

The characteristics of the positive electrode active material prepared in Example 9 are shown in Table 3. As in Example 1, a 18650 type batter was prepared, and the weight energy density and the cycle characteristic were evaluated, and the results are show in Table 4. It can be seen that the positive electrode prepared in Example 9 also shows high performance.

Example 10

In Example 10, except that lithium hydroxide, manganese oxide, and nickel oxide were used and weighed so that Li:Mn:Ni may become 1.07:1.83:0.10 at the raw material ratio instead of that Li:Mn:Ni may become 1.07:1.90:0.03, a surface-treated positive electrode active material was prepared as in Example 1.

Al within the obtained positive electrode active material was 0.26 wt % relative to Mn, and the depth at which the atomic concentration of Al becomes approximately 0 was 70 nm. Moreover, the dissolution amount of Mn was 0.9 wt ppm.

The characteristics of the positive electrode active material prepared in Example 10 are shown in Table 3. As in Example 1, a 18650 type batter was prepared, and the weight energy density and the cycle characteristic were evaluated, and the results are show in Table 4. It can be seen that the positive electrode prepared in Example 10 also shows high performance.

Example 11

In Example 11, except that lithium hydroxide, manganese oxide, and nickel oxide were used and weighed so that Li:Mn:Ni may become 1.00:1.94:0.06 at the raw material ratio instead of that Li:Mn:Ni may become 1.07:1.90:0.03, a surface-treated positive electrode active material was prepared as in Example 1.

Al within the obtained positive electrode active material was 0.26 wt % relative to Mn, and the depth at which the atomic concentration of Al becomes approximately 0 was 75 nm. Moreover, the dissolution amount of Mn was 0.9 wt ppm.

The characteristics of the positive electrode active material prepared in Example 11 are shown in Table 3. As in Example 1, a 18650 type batter was prepared, and the weight energy density and the cycle characteristic were evaluated, and the results are show in Table 4. It can be seen that the positive electrode prepared in Example 11 also shows high performance.

Example 12

In Example 12, except that lithium hydroxide, manganese oxide, and nickel oxide were used and weighed so that Li:Mn:Ni may become 1.12:1.87:0.01 at the raw material ratio instead of that Li:Mn:Ni may become 1.07:1.90:0.03, a surface-treated positive electrode active material was prepared as in Example 1.

Al within the obtained positive electrode active material was 0.26 wt % relative to Mn, and the depth at which the atomic concentration of Al becomes approximately 0 was 60 nm. Moreover, the dissolution amount of Mn was 1.2 wt ppm.

The characteristics of the positive electrode active material prepared in Example 12 are shown in Table 3. As in Example 1, a 18650 type batter was prepared, and the weight energy density and the cycle characteristic were evaluated, and the results are show in Table 4. It can be seen that the positive electrode prepared in Example 12 also shows high performance.

Al within the obtained positive electrode active material was 0.26 wt % relative to Mn, and the average depth at which the atomic concentration of Al becomes approximately 0 was 20 nm. Moreover, the dissolution amount of Mn was 4.2 wt ppm.

The characteristics of the positive electrode active material prepared in Example 13 are shown in Table 3. As in Example 1, a 18650 type batter was prepared, and the weight energy density and the cycle characteristic were evaluated, and the results are shown in Table 6. Table 5 and Table 6 revealed that the cycle characteristic is poor as compared with the one prepared in Example 1.

TABLE 3

| Positive electrode active material | Composition in $Li_aMn_bM_cO_{4-d}F_d$ | | | Valence of Mn | Surface layer | Amount of surface treatment metal (wt %) | Solution depth (nm) | Dissolution amount of Mn (wtppm) |
| --- | --- | --- | --- | --- | --- | --- | --- | --- |
| | a | b | M | c | | | | | |
| Example 2 | 1.07 | 1.90 | Ni | 0.03 | 3.62 | $Co_2O_3$ | 0.36 | 70 | 0.9 |
| Example 3 | 1.07 | 1.90 | Ni | 0.03 | 3.62 | $Fe_2O_3$ | 0.35 | 85 | 1.6 |
| Example 4 | 1.07 | 1.90 | Ni | 0.03 | 3.62 | $AlPO_4$ | 0.22 | 65 | 0.6 |
| Example 5 | 1.07 | 1.90 | Ni | 0.03 | 3.62 | $Co_3(PO_4)_2$ | 0.24 | 50 | 1.0 |
| Example 6 | 1.07 | 1.90 | Ni | 0.03 | 3.62 | $FePO_4$ | 0.24 | 65 | 1.3 |
| Example 7 | 1.07 | 1.90 | Mg | 0.03 | 3.62 | $Al_2O_3$ | 0.26 | 95 | 1.4 |
| Example 8 | 1.07 | 1.90 | Cu | 0.03 | 3.62 | $Al_2O_3$ | 0.26 | 100 | 1.0 |
| Example 9 | 1.15 | 1.80 | Ni | 0.05 | 3.75 | $Al_2O_3$ | 0.26 | 60 | 0.5 |
| Example 10 | 1.07 | 1.83 | Ni | 0.10 | 3.68 | $Al_2O_3$ | 0.26 | 70 | 0.9 |
| Example 11 | 1.00 | 1.94 | Ni | 0.06 | 3.55 | $Al_2O_3$ | 0.26 | 75 | 0.9 |
| Example 12 | 1.12 | 1.87 | Ni | 0.01 | 3.67 | $Al_2O_3$ | 0.26 | 60 | 1.2 |

TABLE 4

| Positive electrode active material | Power density (Wh/kg) | Capacity retention (%) |
| --- | --- | --- |
| Example 2 | 98 | 90 |
| Example 3 | 92 | 85 |
| Example 4 | 111 | 91 |
| Example 5 | 108 | 89 |
| Example 6 | 102 | 86 |
| Example 7 | 106 | 88 |
| Example 8 | 97 | 86 |
| Example 9 | 95 | 87 |
| Example 10 | 93 | 91 |
| Example 11 | 121 | 86 |
| Example 12 | 92 | 85 |

The following examples show the experiments that were conducted to find out the preferable conditions about each of the surface treatment temperature, the kind of a salt used in the surface treatment, and the salt concentration used in the surface treatment in the present invention. For the preferable conditions, in comparison with the characteristic of the positive electrode active material of Example 1, the following examples show the conditions that might provide characteristic poorer than that of the positive electrode active material of Example 1. Accordingly, this does not mean that the following examples were known prior to this application.

Example 13

In Example 13, except that the heating time was set to 3 minutes in the surface treatment step, a surface-treated positive electrode active material was prepared as in Example 1.

Example 14

In Example 14, except that the heating time was set to one hour in the surface treatment step, a surface-treated positive electrode active material was prepared as in Example 1.

Al within the obtained positive electrode active material was 0.26 wt % relative to Mn, and the atomic concentration of Al was 10% even at a depth of 100 nm. In this case, the dissolution amount of Mn was 5.0 wt ppm. Table 5 shows the characteristics of the positive electrode active materials prepared in Examples 1, 4. As in Example 1, a 18650 type batter was prepared, and the weight energy density and the cycle characteristic were evaluated, and the results are shown in Table 6. Table 5 and Table 6 revealed that the power density and the cycle characteristic are poor as compared with the one prepared in Example 1.

Example 15

In Example 16, except that 4.4 g of aluminum nitrate and 1.5 g of lithium hydroxide instead of 2.2 g of aluminum nitrate and 0.8 g of lithium hydroxide were used in the surface treatment step, a surface-treated positive electrode active material was prepared as in Example 1.

Al within the obtained positive electrode active material was 0.52 wt % relative to Mn, and the average depth at which the atomic concentration of Al becomes approximately 0 from the external surface was 95 nm. Moreover, the dissolution amount of Mn was 2.3 Wt ppm.

Table 5 shows the characteristics of the positive electrode active material prepared in Example 15. As in Example 1, a 18650 type batter was prepared, and the weight energy density and the cycle characteristic were evaluated, and the results are shown in Table 6. Table 5 and Table 6 revealed that the power density and the cycle characteristic are poor as compared with the one prepared in Example 1.

Example 16

In Example 16, except that 0.8 g of aluminum nitrate and 0.3 g of lithium hydroxide instead of 2.2 g of aluminum nitrate and 0.8 g of lithium hydroxide were used in the surface treatment step, a surface-treated positive electrode active material was prepared as in Example 1.

Al within the obtained positive electrode active material was 0.09 wt % relative to Mn, and the depth at which the atomic concentration of Al becomes approximately 0 was 50 nm. Moreover, the dissolution amount of Mn was 5.7 wt ppm.

Table 5 shows the characteristics of the positive electrode active material prepared in Example 16. As in Example 1, a 18650 type battery was prepared, and the weight energy density and the cycle characteristic were evaluated, and the results are shown in Table 6. Table 5 and Table 6 revealed that the cycle characteristic is poor as compared with the one prepared in Example 1.

Example 17

In Example 17, except that lithium hydroxide, manganese oxide, and nickel oxide were used and weighed so that Li:Mn may become 1.10:1.90 where Ni=0 instead of that Li:Mn:Ni may become 1.07:1.90:0.03, a surface-treated positive electrode active material was prepared as in Example 1.

Al within the obtained positive electrode active material was 0.26 wt % relative to Mn, and the depth at which the atomic concentration of Al becomes approximately 0 was 55 nm from the external surface. Moreover, the dissolution amount of Mn was 28.6 wt ppm.

Table 5 shows the characteristics of the positive electrode active material prepared in Example 17. As in Example 1, a 18650 type battery was prepared, and the weight energy density and the cycle characteristic were evaluated, and the results are shown in Table 6. Table 5 and Table 6 revealed that the cycle characteristic is poor as compared with the one prepared in Example 1.

Figure 3:
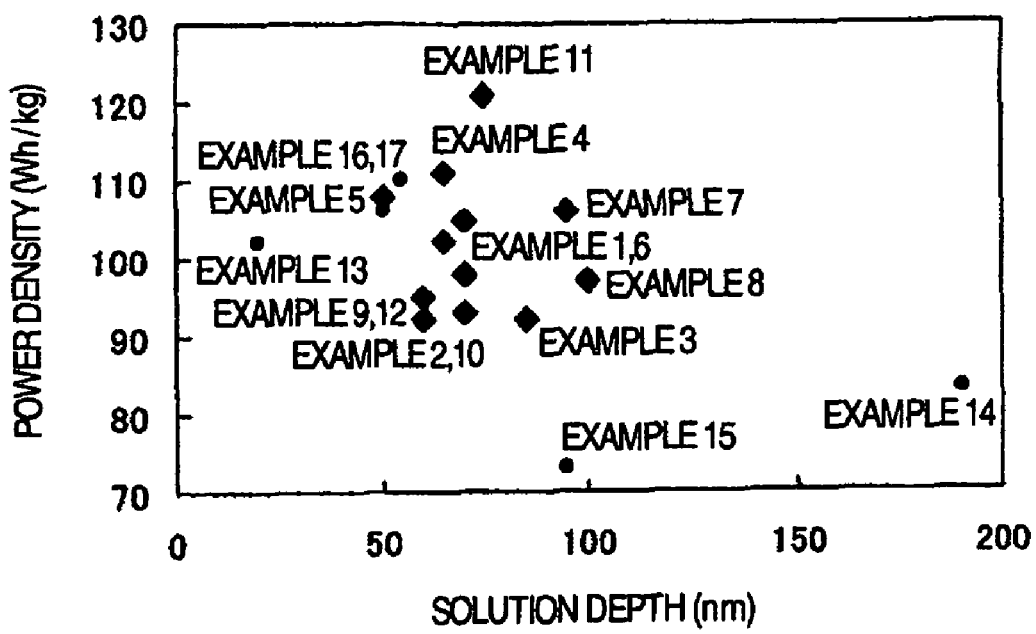
FIG. 3 is a graph showing a relationship of the power density with respect to the depth (solution depth) at which the atomic concentration of a metallic element contained within a metal oxide used in the surface treatment becomes approximately 0%.
Figure 4:
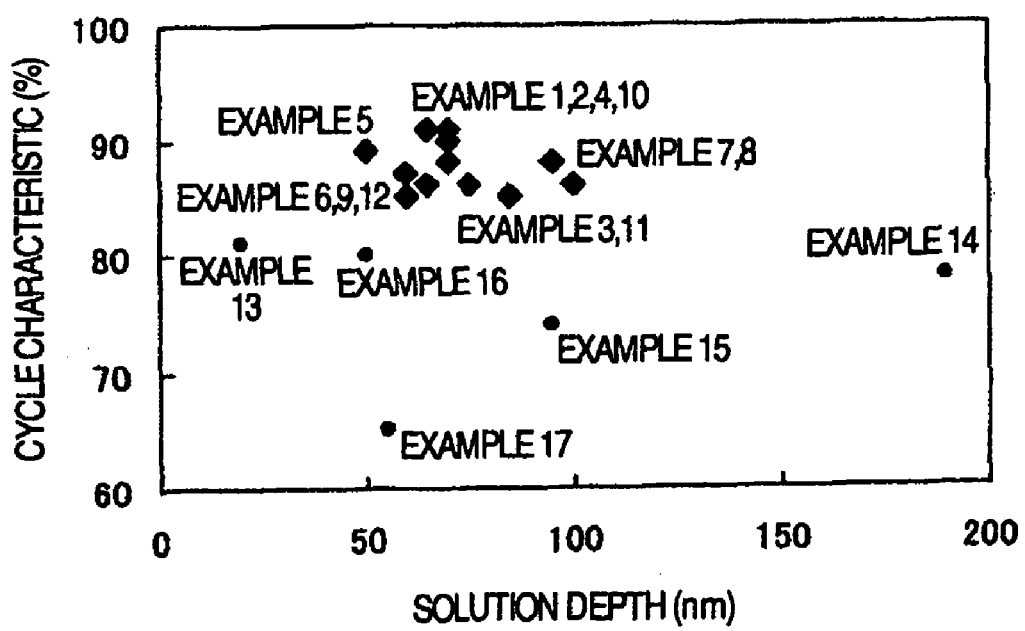
FIG. 4 is a graph showing a relationship between the solution depth and the cycle characteristic.

FIG. 3 and FIG. 4 show the evaluation results with regard to Example 1 to Example 17 described above. FIG. 3 shows the power density versus the average depth (average thickness of the solid solution layer) at which the atomic concentration of a metallic element contained within the metal oxide used in the surface treatment becomes approximately 0%. FIG. 4 shows the cycle characteristic versus solution depth. The cycle characteristic was obtained by measuring the residual capacity. From these data, it can be seen that the batteries whose average depth, at which the atomic concentration of a metallic element contained within the metal oxide became approximately 0%, is in a range of 50 to 100 nm exhibit excellent characteristics, such as the power density of no less than 90 Wh/kg and the cycle characteristic of no less than 85%.

According to the present embodiment, the surface of the spinel manganese substituted with an element is treated, and the average depth, at which the atomic concentration of a metallic element contained within the metal oxide used in the surface treatment becomes approximately 0%, is specified to 50 to 100 nm, whereby a positive electrode active material excellent in cycle characteristic can be formed and a long-life lithium secondary battery using this positive electrode active material can be provided.

Figure 5:
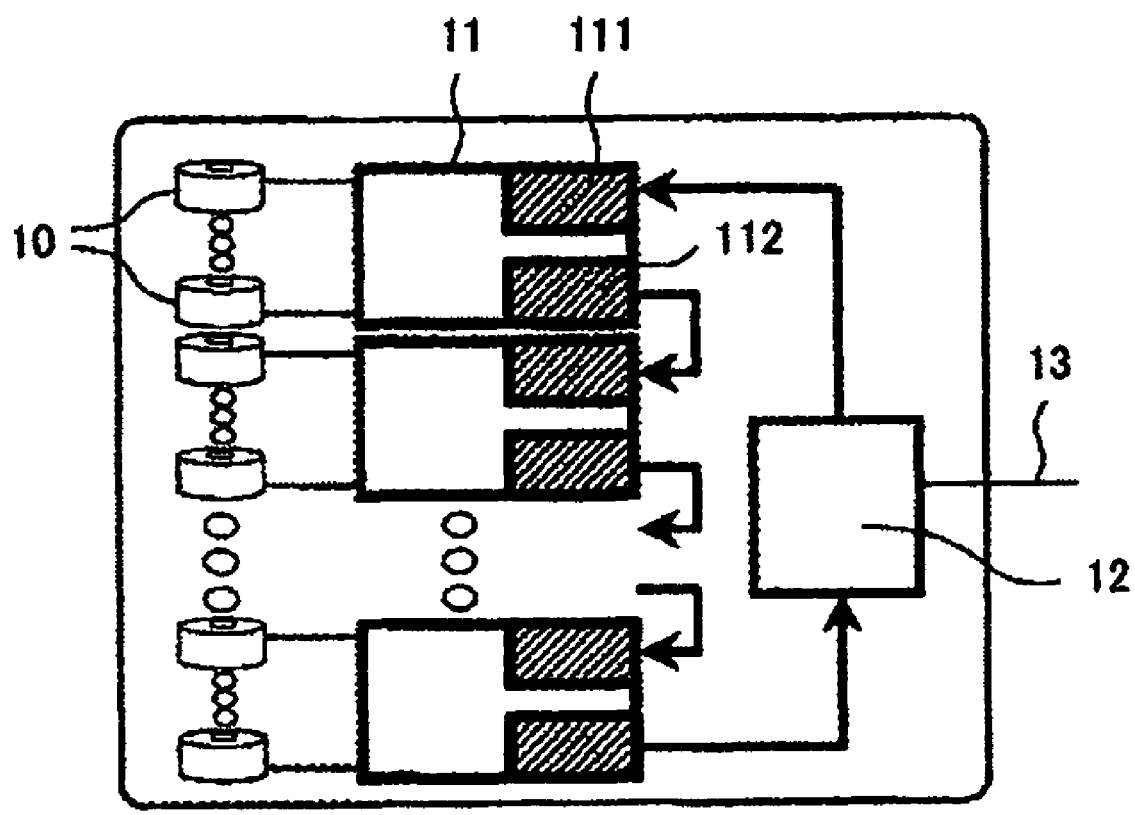
FIG. 5 is a block diagram showing the outline of a secondary battery system.

Moreover, FIG. 5 shows a secondary battery system with the lithium secondary batteries that were prepared in the present embodiment. A plurality of lithium secondary batteries 10 (e.g., 4 to 8 pieces) are connected in series to form a lithium secondary battery. Furthermore, a plurality of these lithium batteries are connected to configure a group of lithium secondary batteries.

A cell controller 11 is formed corresponding to such a group of lithium secondary batteries, respectively, and controls the lithium secondary batteries 10. The cell controller 11 monitors the over-charge or over-discharge of the lithium secondary battery 10 or monitors the remaining capacity of the lithium secondary battery 10.

A battery controller 12 provides a signal to the cell controller 11 using a communication means, for example, and also acquires a signal from the cell controller 11 using a communication means, for example. The battery controller 12 controls the input/output of electric power with respect to the cell controller 11.

The battery controller 12 provides a signal to an input section 111 of the first cell controller 11, for example. Such a signal is transmitted from an output section 112 of the cell controller 11 to the input section 111 of other cell controller 11, in series. This signal is provided from the output section 112 of the last cell controller 11 to the battery controller 12. Thus, the battery controller 12 can monitor the cell controllers 11.

TABLE 5

| Positive electrode active material | Composition in $Li_aMn_bM_cO_4$ | | | | Valence of Mn | Surface layer | Amount of surface treatment metal (wt %) | Solution depth (nm) | Dissolution amount of Mn (wtppm) |
|---|---|---|---|---|---|---|---|---|---|
| | a | b | M | c | | | | | |
| Example 13 | 1.07 | 1.90 | Ni | 0.03 | 3.62 | $Al_2O_3$ | 0.26 | 20 | 4.2 |
| Example 14 | 1.07 | 1.90 | Ni | 0.03 | 3.62 | $Al_2O_3$ | 0.26 | >100 | 5.0 |
| Example 15 | 1.07 | 1.90 | Ni | 0.03 | 3.62 | $Al_2O_3$ | 0.52 | 95 | 2.3 |
| Example 16 | 1.07 | 1.90 | Ni | 0.03 | 3.62 | $Al_2O_3$ | 0.09 | 50 | 5.7 |
| Example 17 | 1.10 | 1.90 | — | — | 3.63 | $Al_2O_3$ | 0.26 | 55 | 28.6 |

TABLE 6

| Positive electrode active material | Power density (Wh/kg) | Capacity retention (%) |
|---|---|---|
| Example 13 | 102 | 81 |
| Example 14 | 83 | 78 |
| Example 15 | 73 | 74 |
| Example 16 | 106 | 80 |
| Example 17 | 110 | 65 |

INDUSTRIAL APPLICABILITY

The lithium secondary battery of the present invention is particularly useful as a large-sized stationary power supply.

ADVANTAGES OF THE INVENTION

According to the present invention, a lithium secondary battery having a long-life characteristic and a high power density can be provided.

The invention claimed is:

1. A lithium secondary battery comprising:
a positive electrode capable of intercalating and deintercalating lithium; and
a negative electrode capable of intercalating and deintercalating lithium,
wherein the positive electrode comprises a manganese-containing positive electrode active material of a spinel structure represented by a general formula $Li_aMn_b\text{-}M_cO_4$, where, $1.0 \leq a \leq 1.15$, $1.8 \leq b \leq 1.94$, $0.01 \leq c \leq 0.10$, a+b+c=3, and M is a substitutional element, and is one or more elements selected from the group consisting of Mg, Ni, and Cu, and an oxide coating a surface of the positive electrode active material,
wherein the oxide coating the surface of the positive electrode active material contains first atoms of at least one metallic element selected from the group consisting of Al, Co, and Fe,
wherein second atoms of the at least one metallic element form a solid solution with the positive electrode active material, and
wherein an atomic concentration of second atoms of the at least one metallic element is approximately 0 at an average depth of from 50 to 100 nm from an external surface of the positive electrode active material.

2. The lithium secondary battery according to claim 1, wherein the oxide comprises a first portion coating the surface of the positive electrode active material and a second portion contained in a surface area of the positive electrode active material.

3. The lithium secondary battery according to claim 1, wherein an atomic concentration of the at least one metallic element within the oxide at an external surface of the positive electrode active material layer is from 10 to 40%.

4. The lithium secondary battery according to claim 1, wherein an amount of the at least one metallic element contained within the oxide is from 0.05 to 0.5 wt % relative to Mn contained within the active material.

5. The lithium secondary battery according to claim 1, wherein an average particle size of the positive electrode active material is from 10 to 40 μm.

6. A lithium secondary battery, comprising: a positive electrode capable of intercalating and deintercalating lithium; and an negative electrode capable of intercalating and deintercalating lithium, wherein the positive electrode comprises a manganese-containing positive electrode active material of a spinel structure represented by a general formula $Li_aMn_b\text{-}M_cO_4$, where, $1.0 \leq a \leq 1.15$, $1.8 \leq b \leq 1.94$, $0.01 \leq c \leq 0.10$, a+b+c=3, and M is a substitutional element, and is one or more elements selected from the group consisting of Mg, Ni, and Cu, and an oxide coating a surface of the positive electrode active material, wherein the oxide coating the surface of the positive electrode active material contains first atoms of at least one metallic element selected from the group consisting of Al, Co, and Fe, wherein second atoms of the at least one metallic element form a solid solution with the positive electrode active material in a solid solution layer, wherein an average thickness of the solid solution layer is in a range of 50 to 100 nm from an external surface of the positive electrode active material, wherein the capacity retention after 1000 cycles performed in a range of 2.7 to 4.2 V at 0.2 C under environment of 50° C. is no less than 85%, and wherein a power density is no less than 90 Wh/kg.

7. The lithium secondary battery according to claim 6, wherein the oxide comprises a first portion coating the surface of the positive electrode active material and a second portion contained in a surface area of the positive electrode active material.

8. The lithium secondary battery according to claim 6, wherein an atomic concentration of the at least one metallic element within the oxide at an external surface of the positive electrode active material layer is from 10 to 40%.

9. The lithium secondary battery according to claim 6, wherein an amount of the at least one metallic element contained within the oxide is from 0.05 to 0.5 wt % relative to Mn contained within the active material.

10. The lithium secondary battery according to claim 6, wherein an dissolution amount of Mn from the positive electrode active material measured by a predetermined method is no more than 2 wt ppm.

11. A lithium secondary battery comprising:
a positive electrode capable of intercalating and deintercalating lithium; and
a negative electrode capable of intercalating and deintercalating lithium,
wherein the positive electrode comprises a manganese-containing positive electrode active material of a spinel structure and an oxide
coating a surface of the positive electrode active material,
wherein the oxide coating the surface of the positive electrode active material contains first atoms of at least one metallic element selected from the group consisting of Al, Co, and Fe
wherein second atoms of the at least one metallic element form a solid solution with the positive electrode active material in a solid solution layer,
wherein an average thickness of the solid solution layer is in a range of 50 to 100 nm from an external surface of the positive electrode,
wherein the positive electrode active material is a spinel structure represented by a general formula $Li_aMn_b\text{-}M_cO_4$, where, $1.0 \leq a \leq 1.15$, $1.8 \leq b \leq 1.94$, $0.01 \leq c \leq 0.10$, a+b+c=3, and M is a substitutional element, and is one or more elements selected from the group consisting of Mg, Ni, and Cu,
wherein an atomic concentration of the first atoms of the metallic element within the oxide at an external surface of the positive electrode active material is from 10 to 40%, and
wherein an amount of the first atoms of the at least one metallic element contained within the oxide is from 0.05 to 0.5 wt % relative to Mn contained within the active material.

12. The lithium secondary battery according to claim 11, wherein the capacity retention after 1000 cycles performed in a range of 2.7 to 4.2 V at 0.2 C under environment of 50° C. is no less than 85%, and wherein a power density is no less than 90 Wh/kg.

13. The lithium secondary battery according to claim 11, wherein the oxide comprises a first portion coating the surface of the positive electrode active material and a second portion contained in a surface area of the positive electrode active material.

* * * * *